May 10, 1932.  J. S. REID  1,857,659
HUB CAP
Filed July 17, 1930
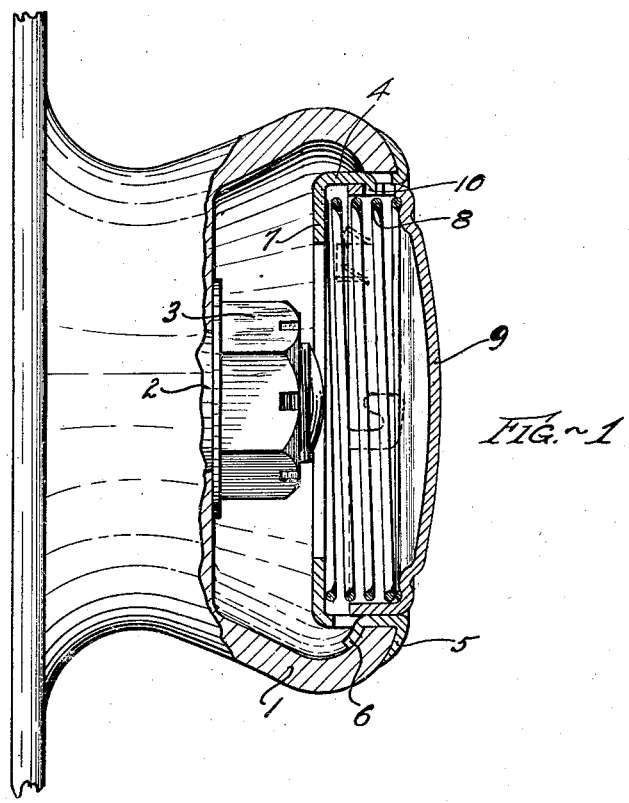
FIG.~1
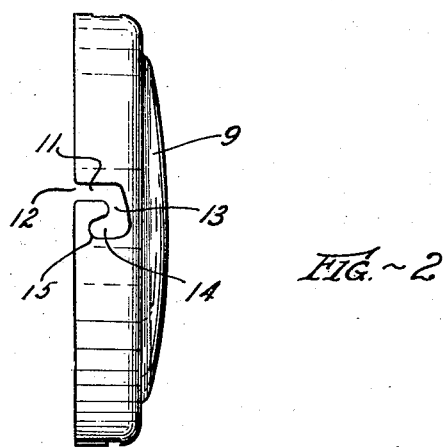
FIG.~2
INVENTOR
JAMES S. REID
BY
Brockett, Hyde, Higley & Meyer
ATTORNEYS Patented May 10, 1932

1,857,659

UNITED STATES PATENT OFFICE

JAMES S. REID, OF SHAKER HEIGHTS, OHIO, ASSIGNOR TO THE REID PRODUCTS COMPANY, OF CLEVELAND, OHIO, A CORPORATION OF OHIO

HUB CAP

Application filed July 17, 1930. Serial No. 468,674.

This invention relates to hub caps for the wheels of motor vehicles or the like, its object being to provide a hub cap of simple form which is so arranged as to yield in case of shock or impact and therefore avoid injury to the cap, but which nevertheless may be readily opened for access to the axle nut or for other purposes.

Further objects of the invention are in part obvious and in part will appear more in detail hereinafter.

In the drawings, Fig. 1 is a view partly in elevation and partly in longitudinal section showing the device applied to a hub and Fig. 2 is a side elevation of the movable cap part.

Referring to the drawings, 1 represents more or less conventionally the protruding end of the hub of the wheel or, in other words, the sleeve part which surrounds the protruding end of the axle 2 and its nut 3. The hub sleeve may be of any suitable form or configuration and the present cap, of course, will be adapted in shape to the character of the hub part, the shape shown in the drawings being purely for purposes of illustration and not in any sense of restriction.

The present hub cap embodies a part adapted for convenient attachment to the hub part 1, preferably in such manner as to be relatively stationary relative thereto, together with a movable cap part which is adapted to yield under impact, such as by a glancing blow from some other part. The relatively stationary part is the sleeve member 4, which is a metal annulus of sleeve form with an outer flange 5 turned outwardly and overlapping and hiding the edge of the hub 1 to which it is secured. A convenient method of securing the sleeve to the hub is by forming a plurality, say three or more, of tongues or ears 6 at the inner edge of the sleeve 4, as a result of which to attach the sleeve to the hub it is pushed into place by telescoping movement and the tongues or ears 6 are bent outwardly to the position shown in Fig. 1, which permanently attaches the sleeve to the hub.

The inner edge of the sleeve 4 is bent inwardly, entirely around its periphery, to form a spring seat or flange 7 upon which is placed a spiral compression spring 8 housed within the movable cap member 9, which is of shell form, its outer surface being curved or arched in any simple or desirable shape and impressed or otherwise provided with ornamental features, if desired.

A suitable locking connection is provided between the movable shell 9 and the stationary sleeve 4, such as a bayonet joint connection involving pins or projections on one of the parts and proper slots or openings on the other. In the arrangement shown, several, say four, small tongues or teats of metal 10 are sheared out and bent inwardly toward the central axis from the sleeve 4 and these tongues cooperate with the bayonet joint slots 11, each of which has an open gateway 12 at the inner edge of the skirt of shell 9, a lateral passage 13, and an inner locking and holding slot or recess 14.

The shell 9 is inserted to position by registering its gateway 12 with the projections 10 and pushing the shell by telescoping motion to its seat against the compression of spring 8 until the pins 10 are opposite the lateral passages 13, whereupon the shell is rotated to bring the projections 10 into the recesses 14, when the shell is permitted to spring outwardly to its final position, in which the projections 10 are at the shoulders or abutments 15 at the end of the recesses 14. In this position the outer surface of the cap as a whole is continuous, with a simple crack or joint between the outer edge of the shell 9 and the surrounding sleeve 4. If the hub of the wheel strikes an obstruction so that the shell 9 receives a blow, it merely yields inwardly without receiving a dent and then springs outwardly to its original position. When access to the axle nut is desired, the shell is pushed in and turned until the projections 10 can pass out from the bayonet joint slots.

What I claim is:

1. A hub cap, comprising a relatively stationary ring-like member adapted for attachment to a wheel hub, a closure shell member telescoping thereinto, spring means lying between the closure and stationary members and urging the former outwardly, and yieldable releasable locking means between said closure and ring-like members.

2. A hub cap, comprising a hollow shell, a compression spring housed within the same, an annulus surrounding said shell and provided with a seat for said spring, releasable locking means between the shell and annulus, and means for securing said annulus to a wheel hub.

In testimony whereof I hereby affix my signature.

JAMES S. REID.